(12) United States Patent
Ryther et al.

(10) Patent No.: US 9,383,018 B2
(45) Date of Patent: Jul. 5, 2016

(54) ROTARY CARTRIDGE SEAL WITH INTERNAL FACE-SEALING SURFACES

(71) Applicants: Tyler James Ryther, West Valley, UT (US); Raymond Lee Chaplin, Draper, UT (US)

(72) Inventors: Tyler James Ryther, West Valley, UT (US); Raymond Lee Chaplin, Draper, UT (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/385,319

(22) PCT Filed: Mar. 15, 2013

(86) PCT No.: PCT/US2013/032252
§ 371 (c)(1),
(2) Date: Sep. 15, 2014

(87) PCT Pub. No.: WO2013/138749
PCT Pub. Date: Sep. 19, 2013

(65) Prior Publication Data
US 2015/0061229 A1     Mar. 5, 2015

Related U.S. Application Data

(60) Provisional application No. 61/611,255, filed on Mar. 15, 2012.

(51) Int. Cl.
*F16J 15/34* (2006.01)
*F16J 15/32* (2016.01)

(52) U.S. Cl.
CPC ............ *F16J 15/348* (2013.01); *F16J 15/3224* (2013.01); *F16J 15/3452* (2013.01)

(58) Field of Classification Search
CPC .... F16J 15/348; F16J 15/3224; F16J 15/3452
USPC .......................................................... 277/375
See application file for complete search history.

(56) References Cited

U.S. PATENT DOCUMENTS

| | | | | | |
|---|---|---|---|---|---|
| 3,934,349 | A | * | 1/1976 | Eibofner | A61C 1/141 433/114 |
| 4,548,547 | A | * | 10/1985 | Deuring | F01P 5/10 277/371 |
| 4,822,057 | A | * | 4/1989 | Chia | F16J 15/3496 175/371 |
| 5,799,953 | A | * | 9/1998 | Henderson | F16J 15/3236 277/554 |
| 8,714,560 | B2 | * | 5/2014 | Faas | F16J 15/3236 137/625.3 |
| 2002/0074732 | A1 | * | 6/2002 | Burroughs | F16J 15/363 277/390 |

(Continued)

*Primary Examiner* — Kristina Fulton
*Assistant Examiner* — Nathan Cumar
(74) *Attorney, Agent, or Firm* — Mark Ussai; SKF USA Inc. Patent Dept.

(57) ABSTRACT

A cartridge seal for sealing a space between a housing and a rotatable shaft includes a rotary sealing member having an inner surface defining a bore for receiving the shaft and a circular outer flange extending radially outwardly from and circumferentially about a central axis, the outer flange having a radial sealing surface. A static seal assembly is disposed about the rotary member and includes an annular casing coupleable with the housing and an annular static sealing member disposed within the casing and having a radial sealing surface engageable with the rotary member sealing surface to form a sealing interface. A biasing member axially biases at least a portion of the static sealing member toward the rotary member flange. An annular collar is disposed within the casing and axially retains the rotary member within the casing such that the seal assembly is mountable on a shaft as a single unit.

18 Claims, 5 Drawing Sheets

(56) References Cited

U.S. PATENT DOCUMENTS

2003/0006563 A1* 1/2003 Cater ................. F16J 15/324
                                                        277/549
2003/0031828 A1* 2/2003 Kosty ................. F16J 15/3228
                                                        428/122
2006/0103074 A1* 5/2006 Droscher ............ F16J 15/3464
                                                        277/370

* cited by examiner

ROTARY CARTRIDGE SEAL WITH INTERNAL FACE-SEALING SURFACES

The present invention relates to seals, and more particularly seals for high pressure and rotational speed applications.

Seals for high pressure sealing applications, such as used on oil drilling shafts, are typically formed of a polymeric sealing element (e.g., PTFE) having an inner circumferential surface that seals against an outer circumferential surface of a shaft. Due to the high pressures that must be sealed, the PIFE seal element is usually filled to increase wear resistance, typically resulting in the material becoming more abrasive. As such, the sealing element tends to generate substantial wear on the shaft, requiring either a reworking (e.g., plating and grinding) or replacement of the shaft.

SUMMARY OF THE INVENTION

In one aspect, the present invention is a cartridge seal for sealing a space between a housing having a bore and a shaft disposed at least partially within the housing bore and rotatable about a central axis. The cartridge seal comprises a rotary sealing member having an inner circumferential surface defining a bore for receiving a portion of the shaft and a generally circular outer flange extending radially outwardly from and circumferentially about the central axis, the outer flange having a generally radial sealing surface. A static seal assembly is disposed about the rotary sealing member and includes a generally annular casing coupleable with the housing and a generally annular static sealing member disposed within the casing and having a generally radial sealing surface sealingly engageable with the rotary member sealing surface so as to form a primary sealing interface. A biasing member is configured to axially bias at least a portion of the static sealing member generally toward the rotary member flange. Further, a generally annular collar is disposed at least partially within the casing and is configured to axially retain the rotary member within the casing such that the seal assembly is mountable on a shaft as a single unit.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
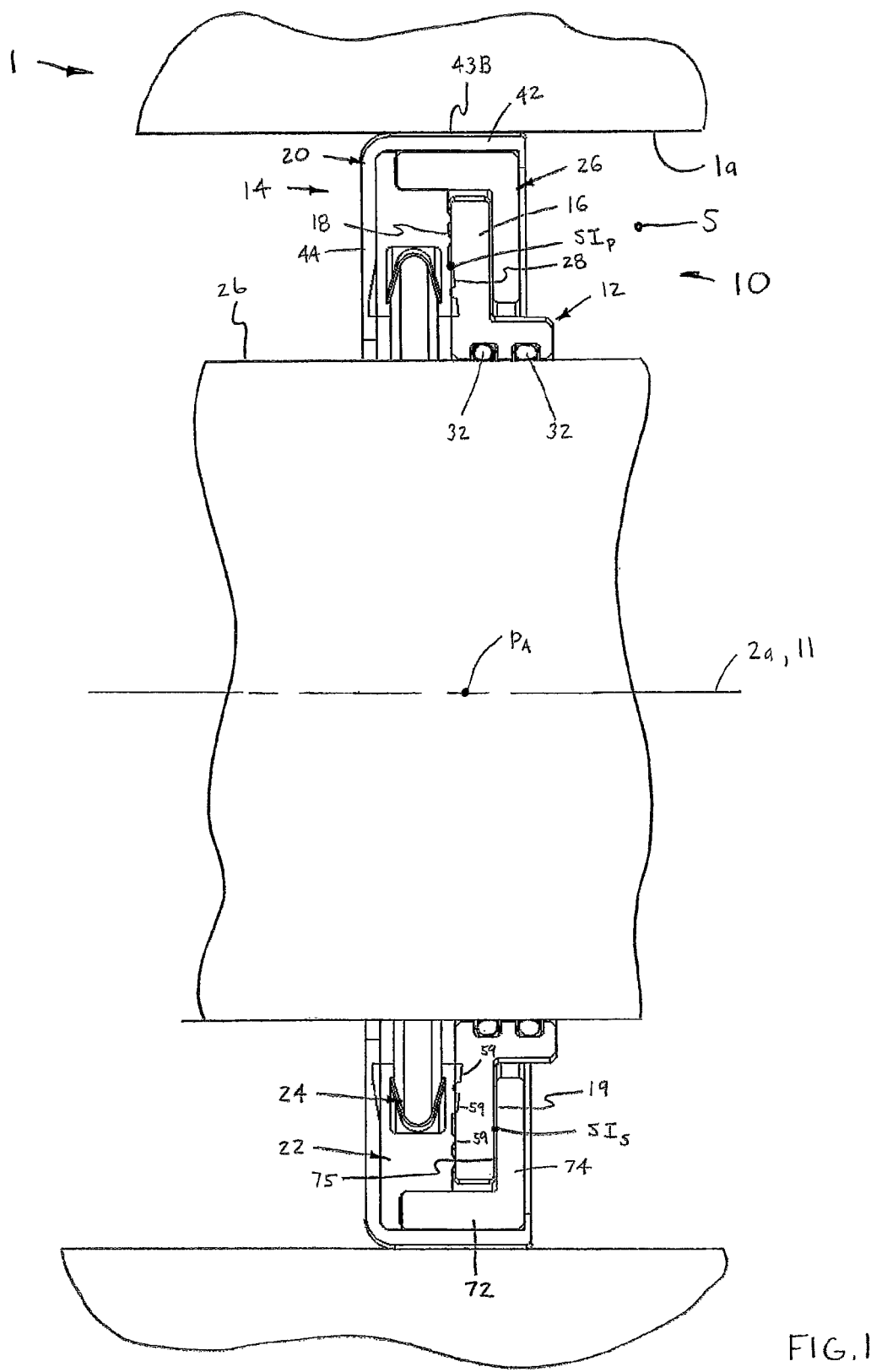
FIG. 1 is an axial cross-sectional view of a cartridge seal of the present invention, shown mounted on a shaft and coupled with a housing.
Figure 2:
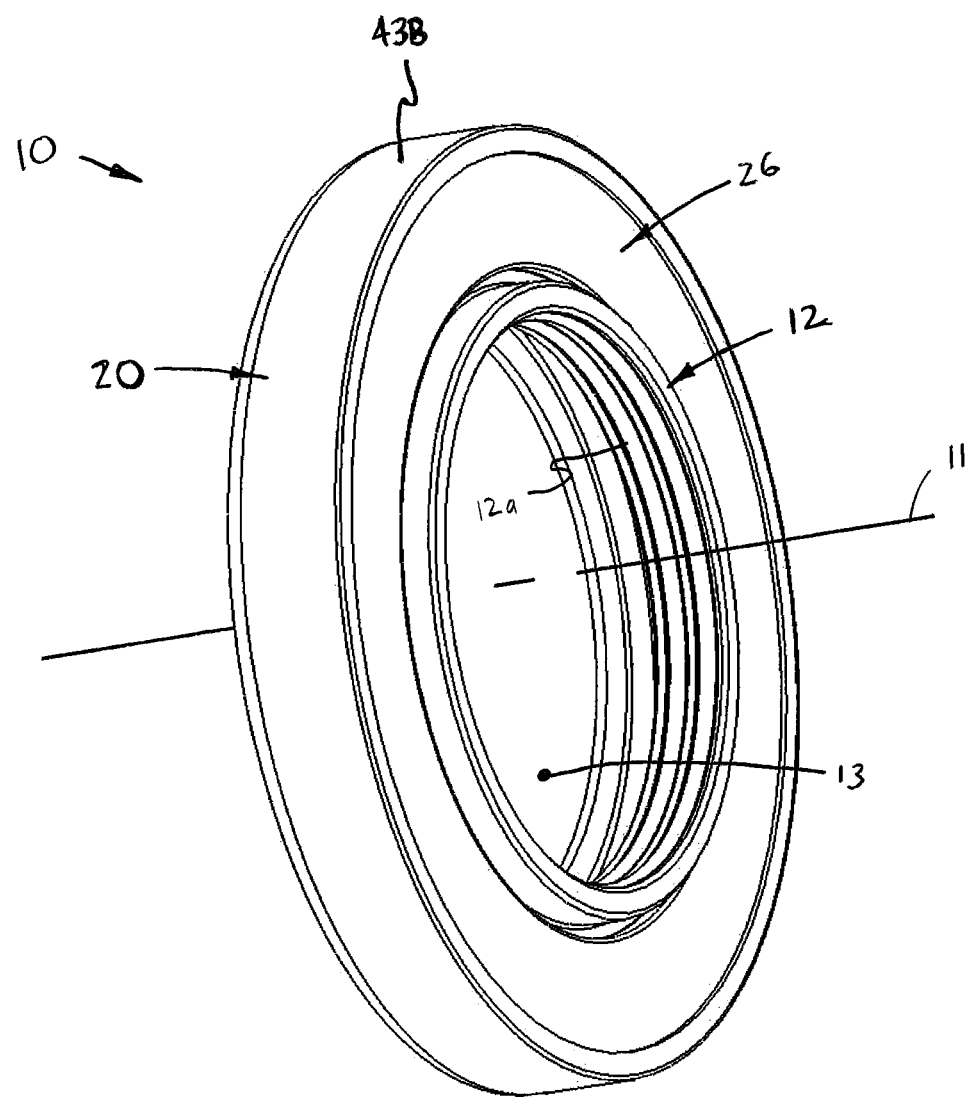
FIG. 2 is a perspective view of the cartridge seal.
Figure 3:
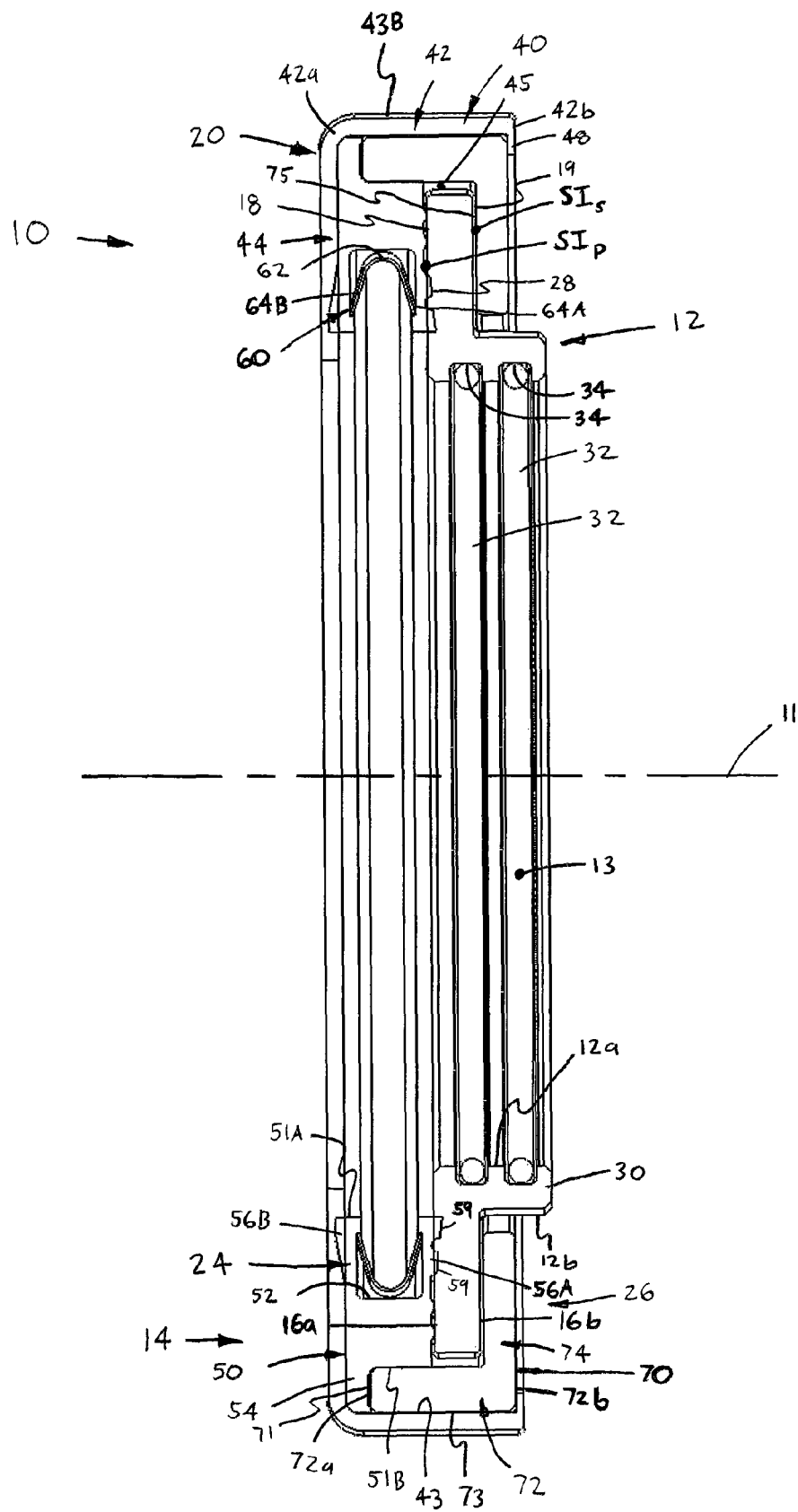
FIG. 3 is another axial cross-sectional view of the cartridge seal, shown separate from the shaft and housing.
Figure 4:
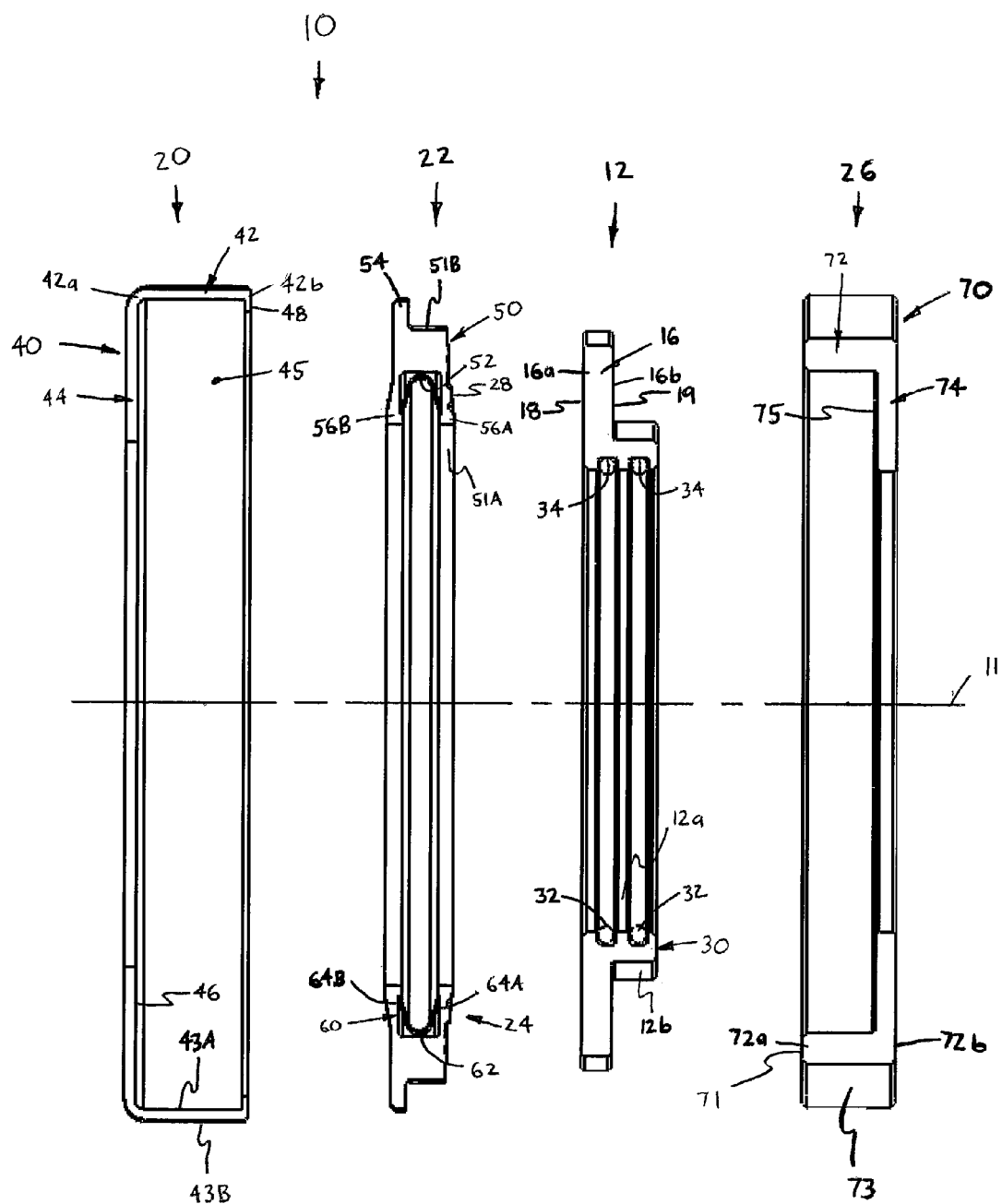
FIG. 4 is an exploded view of the cartridge seal of FIG. 3.

Referring now to the drawings in detail, wherein like numbers are used to indicate like elements throughout, there is shown in FIGS. 1-5 a cartridge seal 10 for sealing a space S between a housing 1 having a bore 1a and a shaft 2 disposed at least partially within the housing bore 1a and rotatable about a central axis 2a (see FIG. 1). The cartridge seal 10 has a central axis 11 and basically comprises a rotary sealing member 12 mountable on the shaft 2 and a static seal assembly 14 disposed about the rotary member 12 and coupleable with the housing 1. The rotary sealing member 12 has an inner circumferential surface 12a defining a bore 13 for receiving a portion of the shaft 2 and a generally circular outer flange 16. The flange 16 extends radially outwardly from and circumferentially about the central axis 11 and has a generally radial sealing surface 18. The static seal assembly 14 includes a generally annular casing 20 coupleable with the housing 1, a generally annular static sealing member 22 disposed within the casing 20, a biasing member 24 configured to bias the static sealing member 22, and a generally annular collar 26.

More specifically, the static sealing member 22 has a generally radial static sealing surface 28 sealingly engageable with the rotary sealing surface 18 so as to form a primary sealing interface $SI_p$. The biasing member 24 is configured to axially bias at least a portion of the static sealing member 22 generally toward the rotary member flange 16 to maintain sealing contact between the surfaces 18, 28. Further, the collar 26 is disposed at least partially within the casing 20 and is configured to axially retain the rotary member 12 within the casing 20 such that the cartridge seal 10 is mountable on the shaft 2 as a single unit. Thereby, the cartridge seal 10 is installed merely by inserting the shaft 2 through the rotary sealing member 12 and engaging the casing 20 with the housing bore la, as described in detail below.

Preferably, the rotary member flange 16, and most preferably the entire sealing member 12, is formed of a metallic material having a hardness of at least forty-five (45) as measured on the Rockwell C scale (i.e., 45 HRC), most preferably within a range of about 45 HRC and 50 HRC. The flange radial sealing surface 18 is preferably formed (e.g., machine ground) having a roughness in the range of about an average roughness of four micro-inches (4 Ra) to an average roughness of eight micro-inches (8 Ra). Further, at least the portion of the static sealing member 22 providing the sealing surface 28 is formed of a wear resistant polymer, most preferably carbon graphite filled polytetrafluoroethylene (PTFE). With such materials and surface finishes, the cartridge seal 10 is capable of maintaining a seal within the primary sealing interface $SI_p$ in high pressure and rotational speed service environments, such as for example, those found in oil drilling applications. However, the rotary sealing member 12 and/or the static sealing member 22 may be formed of any other appropriate material.

Referring to FIGS. 1 and 3-5, the rotary sealing member 12 preferably includes a generally cylindrical portion 30 providing the inner circumferential surface 12a and an opposing outer circumferential surface 12b, the flange 16 extending radially outwardly from the cylindrical portion outer surface 12b. The flange 16 is substantially circular and has first and second opposing axial ends 16a, 16b, the first end 16a providing the radial sealing surface 18 and the second end 16b providing a radial contact surface 19 facing generally away from the sealing surface 18, as discussed in greater detail below. The rotary sealing member 12 is preferably frictionally engageable with the shaft 2 so as to retain the rotary member 12 at about a desired axial position $p_A$ on the shaft axis 2a, as indicated by the center point of the seal 10 in FIG. 1. As such, the rotary sealing member 12 is mountable at any desired position on the shaft 2 and does not require any sleeves, retainer rings, keyways, bolt holes, etc. to secure the sealing member 12 on the shaft 2.

Most preferably, the cartridge seal 10 further comprises at least one and preferably two elastomeric rings 32 (e.g., O-rings) disposeable within the bore 13 of the rotary sealing member 12. The rings 32 are each disposed in a separate one of two axially-spaced annular grooves 34 extending radially outwardly from the rotary member inner surface 12a. Further, each ring 32 is configured to frictionally engage with an outer surface 2b of the shaft 2 so as to axially retain the rotary sealing member 12, as discussed above. With such a mounting method, the rotary sealing member 12, and thus the entire cartridge seal 10, is mountable on a variety of shafts of differing outside diameters.

Referring again to FIGS. 1-5, the casing 20 preferably includes an relatively thin-walled annular body 40 with L-shaped axial cross-sections and including an axial portion 42 having opposing axial ends 42a, 42b and a radial portion 44 extending radially inwardly from one end 42a of the axial portion 42. The casing axial portion 42 has opposing inner and outer circumferential surfaces 43A, 43B, the inner surface 43A defining a bore 45 for containing the various components of the seal 10. The casing outer surface 43B is frictionally engageable with the housing bore 1a so as to couple the cartridge seal 10 with the housing 2, thus eliminating the necessity of providing retainer rings, bolt holes, or other means for coupling the cartridge seal 10 with the housing 1 or at least retaining the static seal assembly 14 at a particular position on the shaft axis 2a.

Further, the casing radial portion 44 has a radial retention surface 46 against which the static sealing member 22 is retained by means of the collar 26, as described below. Preferably, the casing 20 further includes at least one retainer 48 extending radially inwardly from the second end 42b of the axial portion 42 and engageable with the collar 26 so as to axially retain the collar 26 within the casing bore 45, as further discussed below. The retainer 48 is preferably provided by a rolled-edge formed at the end 42b of the casing axial portion 42 after the two sealing members 12 and 22, the biasing member 24 and the collar 26 are assembled into the casing 20.

Referring now to FIGS. 1 and 3-5, the static sealing member 22 includes a generally annular body 50 with an inner and outer circumferential surfaces 51A, 51B, respectively, an annular groove 52 extending radially outwardly from the inner surface 51A, and a flange 54 extending radially outwardly from the outer surface 51B. The annular groove 52 defines a pair of axially spaced-apart radial wall sections 56A, 56B, the one wall section 56A providing a sealing wall section disposeable against the rotary member flange 16, and thus at least a portion of the sealing surface 28 of the static sealing member 22. Preferably, the static sealing member 22 has a plurality of annular projections 59 extending generally axially from the sealing surface 28 and engageable with the rotary sealing surface 18 to further enhance sealing within the primary sealing interface $SI_P$.

Figure 5:
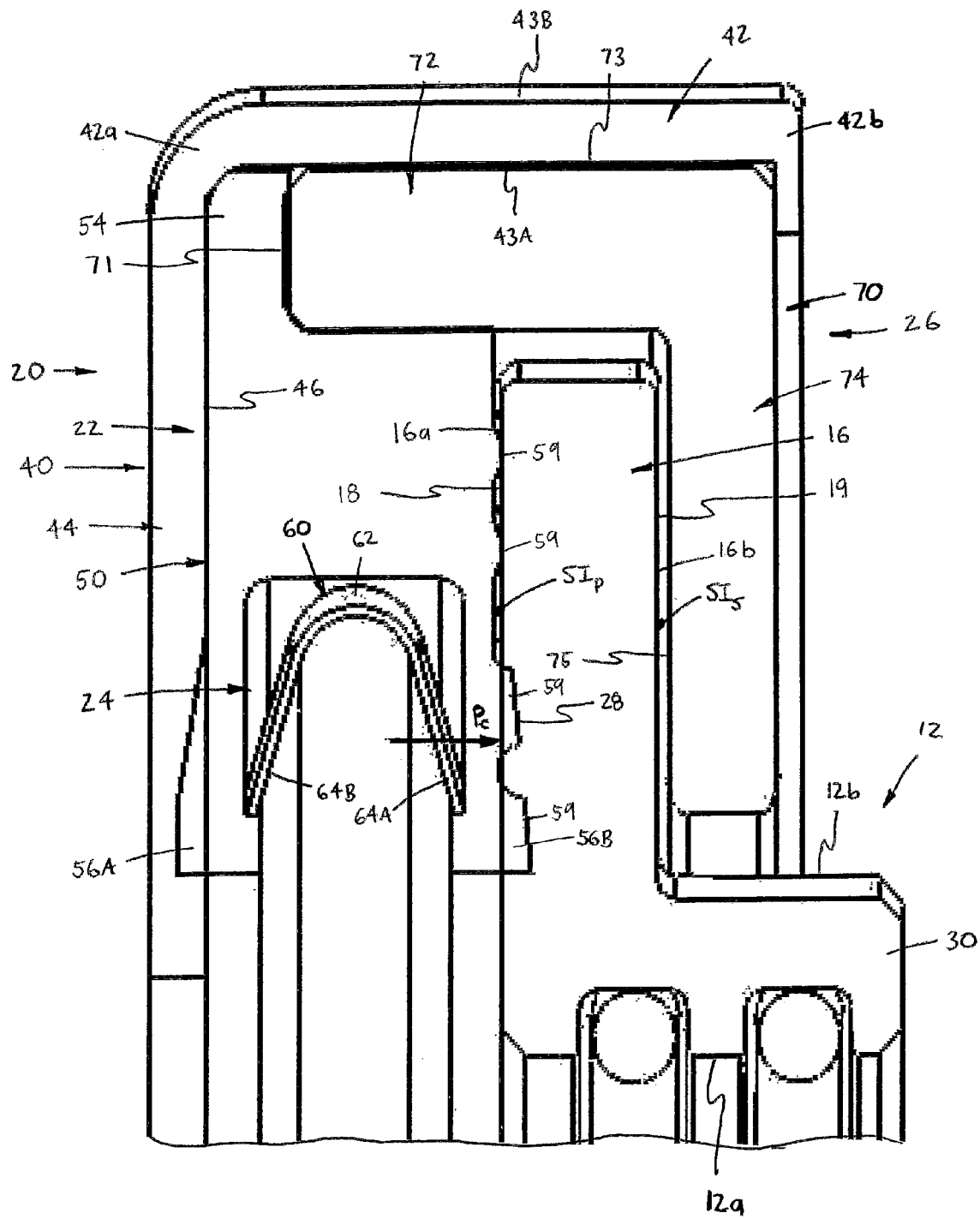
FIG. 5 is an enlarged, broken-away view of the upper portion of the seal shown in FIG. 3.

With the above structure of the static sealing member 22, the biasing member 24 is disposed within the groove 52 and configured to bias the sealing wall section 42A toward the rotary member flange 16. Preferably, the biasing member 24 includes a generally annular V-spring 60 having a central portion 62 and two arms 64A, 64B extending radially inwardly from the central portion 62. Each radial arm 64A, 64B exerts force on a separate, adjacent one of the two sealing member radial wall sections 56A, 56B, respectively, so as to generate contact pressure $P_C$ between the sealing wall section 56A and the rotary member flange 16, as indicated in FIG. 5. However, the biasing member 24 may be provided by any other appropriate type of spring and/or may be positioned within the cartridge seal 10 in any other appropriate manner as long as the particular biasing member 24 maintains engagement between the static and rotary sealing members 22, 12, respectively.

Referring to FIGS. 1-5, the collar 26 is preferably formed as annular body 70 with L-shaped axial cross-sections and including an axial portion 72 with opposing axial ends 72a, 72b and a radial portion 74 extending radially inwardly from the second end 72b of the axial portion 72 and having a radial surface 75. The collar axial portion 72 preferably has an outer circumferential surface 73 that is frictionally engageable with the inner circumferential surface 43A of the casing 20, so as to couple the collar 26 with the casing 20. However, the collar 26 may alternatively be sized so as to fit in the casing 20 with clearance and be retained within the casing bore 45 solely by the casing retainer portion 48, which abuts against the collar axial portion second end 72b.

Further, the collar radial portion 74 is disposeable generally against the rotary sealing member flange 16 so as to axially retain the rotary member 12 within the casing 20, as discussed above. More specifically, when the collar 26 is coupled with the casing 20, the collar radial portion 74 is spaced axially from the casing radial portion 44 and is disposeable generally against the second end 16b of the rotary member flange 16. As such, the rotary sealing member 12 is axially retained generally between the casing radial portion 44 and the collar radial portion 74, and preferably sandwiched between the static sealing member 22 and the collar radial portion 74.

Preferably, the collar portion radial surface 75 is sealingly engageable with the flange radial contact surface 19 so as to form a secondary sealing interface $SI_S$. As such, in the event of axial separation of the primary sealing surfaces 18, 28, the secondary sealing surfaces 19, 75 function to prevent flow through the cartridge seal 10, and thus between the housing 1 and shaft 2. Due to this desired functionality, the collar 26 is preferably formed of a metallic material having a hardness substantially lesser than the hardness of the rotary sealing member 12, most preferably aluminum bronze, with the radial surface 75 formed (i.e., finish machined) having a roughness in the range of about an average roughness of thirty-two micro-inches (32 Ra) to an average roughness of sixty-four micro-inches (64 Ra).

Furthermore, the collar 26 is preferably also configured to axially retain the static sealing member 22 within the casing 20. Specifically, the collar axial portion first end 72a has a radial end surface 71 disposeable against the radial flange 54 of the static sealing member 22, such that the flange 54 is sandwiched between the collar 26 and the casing radial portion 44 when the collar 26 is coupled with the casing 20.

The cartridge seal 10 has a number of advantages over previous seal designs for high pressure and high rotational speed applications, such as in the oil industry. Being completely self-contained, the seal 10 can be mounted at any point on a shaft 2 to seal between the shaft 2 and the associated housing 1 and does not require any additional mounting components/hardware or structural features (e.g., shoulders, bolt holes, keyways, etc.) to be provided on or in either of the shaft 2 or housing 1. Further, by providing all the sealing surfaces contained within the casing 20, wear to the shaft 2 is completely avoided, which eliminates the significant costs associated with reworking (e.g., re-plating and grinding) or replacing the shaft 2. Further, the required surface finishes on the rotary member sealing surfaces 18, 19 and the collar sealing surface 75 are more easily machined on the flat radial surfaces than on a cylindrical/circumferential surface. Furthermore, the face-type radial sealing surface pairs 18/28 and 19/75 are better able to tolerate bore/shaft misalignment and dynamic runout than cylindrical sealing surfaces.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined herein and in the appended claims.

We claim:

1. A cartridge seal for sealing a space between a housing having a bore and a shaft disposed at least partially within the housing bore and rotatable about a central axis, the cartridge seal comprising:
   a rotary sealing member having an inner circumferential surface defining a bore for receiving a portion of the shaft and a generally circular outer flange extending radially outwardly from and circumferentially about the central axis, the outer flange having a generally radial sealing surface; and
   a static seal assembly disposed about the rotary sealing member and including a generally annular casing coupleable with the housing, a generally annular static sealing member disposed within the casing and having a generally radial sealing surface sealingly engageable with the rotary member sealing surface so as to form a primary sealing interface, a biasing member configured to axially bias at least a portion of the static sealing member generally toward the rotary member flange, and a generally annular collar disposed at least partially within the casing, having an axial portion disposed about the rotary sealing member and being configured to axially retain the rotary member within the casing such that the seal assembly is mountable on a shaft as a single unit.

2. The cartridge seal as recited in claim 1 wherein the rotary member flange is formed of a metallic material, the rotary member sealing surface has a hardness of at least 45 as measured on the Rockwell C scale (45 HRC), and at least a portion of the seal member providing the sealing surface is formed of carbon reinforced polymer.

3. The cartridge seal as recited in claim 2 wherein the rotary member is formed of stainless steel having a hardness within a range of about 45 HRC to about 50 HRC, and the seal member is formed of a wear resistant polymer.

4. The cartridge seal as recited in claim 1 wherein the rotary sealing member is frictionally engageable with the shaft so as to retain the rotary member at about a desired axial position on the central axis.

5. The cartridge seal as recited in claim 4 further comprising at least one elastomeric ring disposeable within the bore of the rotary member and configured to frictionally engage with an outer surface of the shaft so as to axially retain the rotary member.

6. The cartridge seal as recited in claim 1 wherein the static sealing member has an inner circumferential surface, an annular groove extending radially outwardly from the inner surface so as to define a pair of axially spaced-apart radial wall sections, one of two radial wall sections being a sealing wall section disposeable against the rotary member flange and providing at least a portion of the static sealing member radial sealing surface, the biasing member being disposed within the groove and configured to bias the sealing wall section toward the rotary member flange.

7. The cartridge seal as recited in claim 6 wherein the static sealing member has a plurality of annular projections extending generally axially from the sealing surface and engageable with the rotary member sealing surface.

8. The cartridge seal as recited in claim 6 wherein the biasing member includes a generally annular V-spring having a central portion and two arms extending radially inwardly from the central portion, each radial arm exerting force on a separate one of the two sealing member radial wall sections so as to generate contact pressure between the sealing wall section and the rotary member flange.

9. The cartridge seal as recited in claim 1 wherein:
   the rotary member flange has first and second opposing axial ends, the first end providing the radial sealing surface and the second end providing a radial contact surface facing generally away from the sealing surface; and
   the collar has an axial portion and a radial portion extending radially inwardly from the axial portion, the collar radial portion being disposeable generally against the rotary member flange portion so as to form a secondary sealing interface.

10. The cartridge seal as recited in claim 9 wherein the rotary sealing member is formed of a metallic material having a first hardness and the collar is formed of a metallic material having a second hardness, the second hardness being substantially lesser than the first hardness.

11. The cartridge seal as recited in claim 1 wherein the collar is configured to axially retain the static sealing member within the casing.

12. The cartridge seal as recited in claim 11 wherein the casing includes a radially inwardly extending section, the static sealing member has a radially outwardly extending flange, and the collar has a radial end surface disposable against the sealing member radial flange such that the sealing member flange is sandwiched between the collar and the casing radial section when the collar is coupled with the casing.

13. The cartridge seal as recited in claim 12 wherein the casing has an axial portion with an inner circumferential surface, the radial portion extending inwardly from the axial portion, and the collar has an outer circumferential surface frictionally engageable with the casing inner circumferential surface so as to couple the collar with the casing.

14. The cartridge seal as recited in claim 1 wherein:
   the rotary member flange has first and second opposing axial ends, the first end providing the radial sealing surface and the second end providing a generally radial contact surface facing generally away from the sealing surface;
   the casing has an axial portion with an inner circumferential surface defining a bore and a radial portion extending radially inwardly from the axial section; and the collar has an axial portion with an outer circumferential surface and a radial portion extending radially inwardly from the axial portion, the collar axial portion being disposeable within the casing bore such that the retainer outer circumferential surface is frictionally engageable with the casing inner circumferential surface to couple the collar with the casing, and the collar radial portion is spaced axially from the casing axial portion and is disposeable generally against the rotary member flange portion such that the rotary member is axially retained generally between the casing radial portion and the collar radial portion.

15. The cartridge seal as recited in claim 14 wherein the casing axial portion has first and second opposing axial ends, the radial portion extending inwardly from the axial portion first end, and the casing further includes a retainer extending radially inwardly from the second end of the casing axial portion and engageable with the collar so as to axially retain the collar within the casing bore.

16. The cartridge seal as recited in claim 14 wherein the rotary member is formed of a metallic material having a first hardness and the collar is formed of a metallic material having a second hardness, the second hardness being substantially lesser than the first hardness.

17. The cartridge seal as recited in claim 1 wherein the casing has an outer circumferential surface frictionally engageable with the housing so as to couple the cartridge seal with the housing.

18. A cartridge seal for sealing a space between a housing having a bore and a shaft disposed at least partially within the housing bore and rotatable about a central axis, the cartridge seal comprising:

a rotary sealing member having an inner circumferential surface defining a bore for receiving a portion of the shaft and a generally circular outer flange extending radially outwardly from and circumferentially about the central axis, the outer flange having a generally radial sealing surface;

a static seal assembly disposed about the rotary sealing member and including a generally annular casing coupleable with the housing, a generally annular static sealing member disposed within the casing and having a generally radial sealing surface sealingly engageable with the rotary member sealing surface so as to form a primary sealing interface, a biasing member configured to axially bias at least a portion of the static sealing member generally toward the rotary member flange, and a generally annular collar coupled with and disposed at least partially within the casing and configured to axially retain the rotary member within the casing such that the seal assembly is mountable on a shaft as a single unit; and wherein the rotary member flange has first and second opposing axial ends, the first end providing the radial sealing surface and the second end providing a radial contact surface facing generally away from the sealing surface and the collar has an axial portion and a radial portion extending radially inwardly from the axial portion, the collar radial portion being disposeable generally against the rotary member flange portion so as to form a secondary sealing interface.

* * * * *